(12) United States Patent
Zhang et al.

(10) Patent No.: US 11,503,614 B2
(45) Date of Patent: Nov. 15, 2022

(54) DOWNLINK DATA TRANSMISSION METHOD AND DEVICE

(71) Applicant: HUAWEI TECHNOLOGIES CO., LTD., Guangdong (CN)

(72) Inventors: Xi Zhang, Chengdu (CN); Lei Chen, Chengdu (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/022,309

(22) Filed: Jun. 28, 2018

(65) Prior Publication Data

US 2018/0310322 A1    Oct. 25, 2018

Related U.S. Application Data

(63) Continuation of application No. PCT/CN2016/106460, filed on Nov. 18, 2016.

(30) Foreign Application Priority Data

Dec. 29, 2015 (CN) .......................... 201511019529.9

(51) Int. Cl.
*H04W 72/08* (2009.01)
*H04B 7/0408* (2017.01)
(Continued)

(52) U.S. Cl.
CPC ........ *H04W 72/085* (2013.01); *H04B 7/0408* (2013.01); *H04B 7/0604* (2013.01);
(Continued)

(58) Field of Classification Search
CPC ............. H04W 72/1289; H04L 5/0044; H04L 5/0048; H04L 5/0055; H04J 3/00
See application file for complete search history.

(56) References Cited

U.S. PATENT DOCUMENTS 9,854,602 B2 * 12/2017 Tabet ................... H04L 5/0053
10,390,361 B2 * 8/2019 Mukkavilli ........... H04L 5/0044
(Continued)

FOREIGN PATENT DOCUMENTS

CN    101627564 A    1/2010
CN    101868926 A    10/2010
(Continued)

OTHER PUBLICATIONS

XP050875754 R1-144667 Intel Corporation,"On Cell Association in Phase Two Evaluation",3GPP TSG-RAN WG1 #79, San Francisco, USA, Nov. 17-21, 2014,total 3 pages.
(Continued)

*Primary Examiner* — Phirin Sam
*Assistant Examiner* — Debebe A Asefa
(74) *Attorney, Agent, or Firm* — Leydig, Voit & Mayer, Ltd.

(57) ABSTRACT

The present disclosure provides a downlink data transmission method, including: using a time-division multiplexing transmission mode in one transmission time interval; sending, by using a wide beam, a control signal to a user served in the current transmission time interval; and grouping users and sending data signals to different user groups by using different narrow beams. In one transmission time interval, time-division multiplexing is used, and a wide beam and a narrow beam are respectively used to transmit a control signal and a data signal. This can avoid a throughput bottleneck resulting from use of a transmission scheme that is based on frequency-division multiplexing only.

18 Claims, 5 Drawing Sheets

(51) Int. Cl.
*H04L 5/00* (2006.01)
*H04W 72/12* (2009.01)
*H04B 7/06* (2006.01)
*H04J 3/16* (2006.01)
*H04W 72/04* (2009.01)

(52) U.S. Cl.
CPC .......... *H04B 7/0617* (2013.01); *H04J 3/1694* (2013.01); *H04L 5/0023* (2013.01); *H04L 5/0053* (2013.01); *H04W 72/048* (2013.01); *H04W 72/1273* (2013.01); *H04W 72/1289* (2013.01)

(56) References Cited

U.S. PATENT DOCUMENTS

| | | | |
|---|---|---|---|
| 2008/0220791 | A1 | 9/2008 | Cho et al. |
| 2009/0129332 | A1 | 5/2009 | Dayal et al. |
| 2013/0051321 | A1* | 2/2013 | Barbieri ............... H04L 1/0027 370/328 |
| 2013/0083753 | A1* | 4/2013 | Lee .................... H04W 72/0453 370/329 |
| 2013/0279356 | A1* | 10/2013 | Park ..................... H04B 7/0695 370/252 |
| 2014/0177521 | A1 | 6/2014 | Agarwal |
| 2014/0269249 | A1 | 9/2014 | Bai et al. |
| 2015/0092563 | A1 | 4/2015 | Tabet et al. |
| 2016/0337916 | A1* | 11/2016 | Deenoo ............. H04W 36/0088 |
| 2017/0013618 | A1* | 1/2017 | Shin ........................ H04L 5/001 |
| 2018/0062720 | A1* | 3/2018 | Islam .................... H04L 5/0053 |
| 2019/0104549 | A1* | 4/2019 | Deng ................... H04B 7/0617 |

FOREIGN PATENT DOCUMENTS

| | | |
|---|---|---|
| CN | 101951639 A | 1/2011 |
| CN | 103139125 A | 6/2013 |
| WO | 2014007595 A1 | 1/2014 |
| WO | 2015109153 A1 | 7/2015 |

OTHER PUBLICATIONS

XP051005229 R2-154740 Ericsson,"Study of shorter TTI for latency reduction",3GPP TSG-RAN WG2 #91 bis,Malmö, Sweden, Oct. 5-9, 2015,total 8 pages.

3GPP TS 36.211 V12.7.0 (Sep. 2015);3rd Generation Partnership Project;Technical Specification Group Radio Access Network;Evolved Universal Terrestrial Radio Access (E-UTRA); Physical channels and modulation(Release 12),total 136 pages.

3GPP TS 36.212 V12.7.0 (Dec. 2015);3rd Generation Partnership Project;Technical Specification Group Radio Access Network;Evolved Universal Terrestrial Radio Access (E-UTRA);Multiplexing and channel coding(Release 12),total 94 pages.

3GPP TS 36.213 V12.8 0 (Dec. 2015);3rd Generation Partnership Project Technical Specification Group Radio Access Network;Evolved Universal Terrestrial Radio Access (E-UTRA); Physical layer procedures(Release 12),total 241 pages.

Document No. ICT-317669-METIS/D1.1,Project Name:Mobile and wireless communications Enablers for the Twenty-twenty Information Society (METIS);Deliverable D1.1,Scenarios, requirements and KPIs for 5G mobile and wireless system; Apr. 29, 2013, Version 1,total 84 pages.

* cited by examiner

DOWNLINK DATA TRANSMISSION METHOD AND DEVICE

CROSS-REFERENCE TO RELATED APPLICATIONS

This application is a continuation of International Application No. PCT/CN2016/106460, filed on Nov. 18, 2016, which claims priority to Chinese Patent Application No. 201511019529.9, filed on Dec. 29, 2015. The disclosures of the aforementioned applications are hereby incorporated by reference in their entireties.

TECHNICAL FIELD

The present disclosure relates to the field of communications technologies, and in particular, to a downlink data transmission method and device.

BACKGROUND

To further improve a transmission rate by using greater bandwidth, a wireless communications system starts to use a higher frequency band. A frequency spectrum lower than 6 GHz may be referred to as a low frequency (LF), and a frequency spectrum ranging from 6 GHz to 100 GHz may be referred to as a high frequency (HF). How to effectively use a high frequency becomes one of current research hotspots in the communications industry. Compared with low-frequency communication, a path loss of a high-frequency signal in a transmission process is more serious. Therefore, a high-frequency base station at a fixed location cannot effectively provide a service for a device in high-speed movement due to a relatively short transmission distance of a high-frequency signal. On this basis, it is currently considered that a next-generation cellular communications system is more likely to use a high and low frequency hybrid networking mode, that is, a low-frequency base station provides long-distance signal coverage and high mobility support, and a high-frequency base station provides a high-speed data transmission service in a hotspot area. FIG. 1 is a schematic diagram of simple networking in the prior art. As shown in FIG. 1, one base station may simultaneously communicate with a plurality of user equipments (UE). In a future communications system, the base station may be a high-frequency base station, a low-frequency base station, or a high and low frequency hybrid base station. To effectively support this working mode, for design of the future communications system, consistency between time granularities of data frame structures when a high frequency and a low frequency are used is sought to facilitate inter-band scheduling. The consistency herein means: 1. A same transmission time interval (TTI) is used when a high frequency and a low frequency are used. 2. When a high frequency and a low frequency are used, a same cycle is used for sending a control signal that is used for scheduling and feedback.

It should be noted that there is a relatively large difference between formats of data transmitted at a high frequency and a low frequency. A communications system working at a low frequency has characteristics of relatively narrow system bandwidth and a relatively low transmission rate. For example, in two communications system that are most commonly used currently: a fourth-generation wireless local area network (WLAN) system and a fourth-generation cellular communications system, i.e., a Long Term Evolution (LTE) system, a system bandwidth is usually tens of megahertz (MHz), and a transmission rate is usually hundreds of megabits per second (Mbps). In contrast, more frequency resources may be used in high-frequency communication. For example, a system bandwidth ranging from hundreds of MHz to thousands of MHz is used, and a transmission rate up to several gigabits per second (Gbps) is provided. In addition, in high-frequency communication, a directional beam formed by beamforming is usually used to send a signal, and a signal gain from beamforming is used to prevent a relatively high path loss and increase a signal coverage area.

FIG. 2 is a schematic diagram of a coverage area of a directional beam signal after the directional beam signal is transmitted for a specific distance. As shown in FIG. 2, after being transmitted for a specific distance, a directional beam signal used in a high-frequency communications system covers a relatively large area, and there may be as many as hundreds of user equipments (UEs) in the coverage area of the beam. With reference to the foregoing description, it can be concluded that a high-frequency communications system needs to provide a single user with a data transmission service whose rate is up to several Gbps, and also needs to simultaneously provide a data transmission service with an intermediate or low rate for a relatively large quantity of users. To achieve such an objective, the high-frequency communications system needs to have a relatively high scheduling degree of freedom.

Under a premise that a same transmission time interval (such as 250 us) is used when a high frequency and a low frequency are used, because a high-frequency system has relatively high bandwidth, a high-frequency link may be used to transmit a huge data packet in one transmission time interval. If these data packets need to be fully used for data transmission for a plurality of users, a relatively high scheduling degree of freedom is required. In addition, in the prior art, a plurality of users who are currently served need to be in a coverage area of a same directional beam generated by a base station. Therefore, the system cannot further obtain a signal-to-noise ratio (SNR) gain brought during signal transmission performed by using a narrower beam, and therefore cannot further improve a system throughput in such a manner. That is, in the prior art, a relatively high scheduling degree of freedom required for high-frequency communication cannot be provided, and a system throughput bottleneck is caused.

SUMMARY

Embodiments of the present disclosure provide a downlink data transmission method and device. In one transmission time interval, time-division multiplexing is used, and a wide beam and a narrow beam are respectively used to transmit a control signal and a data signal, so as to improve a system throughput. To achieve the foregoing objective, the following technical solutions are used in the embodiments of the present disclosure:

According to a first aspect, an embodiment of the present disclosure provides a downlink data transmission method, including:

generating a downlink data frame, where duration of the data frame is one transmission time interval TTI; and the downlink data frame includes a control part located at a header and a data part used for transmitting data of a plurality of users, where time resources occupied by data of at least two users in the data of the plurality of users are different; and the control part carries information about a time location and a frequency location that are allocated to data of each user in the data of the plurality of users; and sending the downlink data frame.

According to a second aspect, an embodiment of the present disclosure provides a downlink data transmission device, including: a processor, a transmitter, and a bus, where the processor and the transmitter are connected by using the bus for data transmission;

the processor is configured to generate a downlink data frame, where duration of the data frame is one transmission time interval TTI; and the downlink data frame includes a control part located at a header and a data part used for transmitting data of a plurality of users, where time resources occupied by data of at least two users in the data of the plurality of users are different; and the control part carries information about a time location and a frequency location that are allocated to data of each user in the data of the plurality of users; and the transmitter is configured to send the downlink data frame.

Time-division multiplexing is used in one transmission time interval, so that a higher scheduling degree of freedom can be provided for a high-frequency communications system, and a scheduling delay corresponding to each user is reduced in a scenario of a high user density and a low rate requirement.

With reference to the first aspect or the second aspect, the embodiments of the present disclosure provide further description as follows:

Optionally, a time resource and a frequency resource that are occupied by the data part are divided into time-frequency resource blocks according to a preset granularity, and the time-frequency resource blocks are numbered. The information about the time location and the frequency location that are occupied by the data of each user in the data of the plurality of users is a number/numbers of one or more time-frequency resource blocks occupied by the data of each user.

Optionally, the data part includes data of a plurality of user groups, and the data of the plurality of user groups is sent in a manner of time-division multiplexing.

Optionally, data of different user groups is sent by using different beams.

According to a method in combination with time-division multiplexing, signals are sent to different user groups by using different narrow beams, so that more targeted signal transmission can be performed for users in a coverage area of a same narrow beam, thereby avoiding a throughput bottleneck resulting from use of a wide-beam transmission scheme that is based on frequency-division multiplexing only, and improving an overall system throughput by using a power gain brought by narrow-beam transmission.

Optionally, the control part is sent by using a first beam, and the data part is sent by using a second beam, where the second beam is different from the first beam.

Optionally, different beams may have different beam configurations, where the beam configuration includes a beam width and a beam direction.

Optionally, a beam width of the second beam is less than a beam width of the first beam; or a beam direction of the second beam is different from a beam direction of the first beam.

According to a method for sending a control signal by using a wide beam, stability of receiving the control signal may be improved, and sensitivity of the control signal to user movement may be reduced.

Optionally, a time interval or a redundant signal used for beam switching is reserved within a time period between sending the data of different user groups.

Optionally, a time interval or a redundant signal used for beam switching is reserved between the control part and the data part.

Optionally, a time resource occupied by the downlink data frame is divided into a plurality of data blocks, where one or more data blocks in the plurality of data blocks are used for beam switching. Further, the plurality of data blocks may be numbered, and a number of the data block used for beam switching is indicated by using the control part.

Optionally, when the downlink data frame is transmitted by using an orthogonal frequency division multiplexing OFDM based multi-carrier waveform, the redundant signal is a cyclic prefix of an OFDM symbol; or when the downlink data frame is transmitted by using a single-carrier frequency division multiple access SC-FDMA based single-carrier waveform, the redundant signal is a cyclic prefix of an SC-FDMA symbol.

In addition, the downlink data transmission method provided in the present disclosure can more efficiently support use of a same transmission time interval and a same control signaling cycle in high-frequency communication and low-frequency communication, so as to facilitate an inter-band scheduling operation and data service transfer and switching operations.

According to a third aspect, an embodiment of the present disclosure provides a signal sending method, including:

generating a downlink data frame, where there is a downlink control signal at a start location of a current transmission time interval, and the downlink control signal includes scheduling information of a plurality of users;

mapping, at a subsequent location of the current transmission time interval, to-be-sent data of the plurality of users to time resource locations and frequency resource locations that are indicated in the scheduling information, where time resource locations at which to-be-sent data of at least two users is located after mapping is performed are different; and modulating and sending the downlink data frame that is in the whole transmission time interval and on which mapping is performed.

According to a fourth aspect, an embodiment of the present disclosure provides a signal receiving method, including:

demodulating a downlink control signal, to obtain scheduling information of a plurality of users from the downlink control signal; and obtaining, according to the scheduling information, information about a time resource location and a frequency resource location at which data sent to a current user is located, and restoring, from a received signal by using the location information, the data sent to the current user.

According to a fifth aspect, an embodiment of the present disclosure provides a signal sending method, including:

sending a downlink control signal at a start location of a current transmission time interval by using a first beam configuration; and sending a downlink data signal at a subsequent location of the current transmission time interval by using a second beam configuration, where the second beam configuration is different from the first beam configuration.

Optionally, the beam configuration includes a beam width and a beam direction.

Optionally, that the second beam configuration is different from the first beam configuration includes: A beam width in the second beam configuration is less than a beam width in the first beam configuration.

According to a sixth aspect, an embodiment of the present disclosure provides a signal sending method, including:

sending a downlink control signal at a first time resource location of a current transmission time interval by using a first beam configuration, where the first time resource location is a time location corresponding to a time resource in the current transmission time interval;

sending a downlink data signal at a second time resource location of the current transmission time interval by using a second beam configuration, where the second time resource location is a time location, corresponding to a time resource, other than the first time resource location in the current transmission time interval; and sending a downlink data signal at a third time resource location of the current transmission time interval by using a third beam configuration, where the third time resource location is a time location, corresponding to a time resource, other than the first time resource location and the second time resource location in the current transmission time interval.

Optionally, a beam width in the second beam configuration is less than or equal to a beam width in the first beam configuration; a beam width in the third beam configuration is less than or equal to the beam width in the first beam configuration; and the beam width in the third beam configuration is not equal to the beam width in the second beam configuration, or a beam direction in the third beam configuration is different from a beam direction in the second beam configuration.

According to a seventh aspect, an embodiment of the present disclosure provides a signal sending method, including:

sending downlink control information at a start location of a current transmission time interval, where the downlink control information includes location information that is used to indicate a time resource used for beam switching; and according to the location information that is included in the downlink control information and that is used to indicate the time resource used for beam switching, sending downlink data and performing beam switching at a corresponding time resource location.

According to an eighth aspect, an embodiment of the present disclosure provides a downlink data sending method, including:

generating a downlink data frame, where duration of the data frame is one transmission time interval TTI; and the downlink data frame includes a control part located at a header and a data part used for transmitting data of a plurality of users, where the control part is sent by using a first beam configuration, the data part is sent by using a second beam configuration, and the second beam configuration is different from the first beam configuration; and sending the downlink data frame.

Optionally, the beam configuration includes a beam width and a beam direction.

Optionally, a beam width in the second beam configuration is less than a beam width in the first beam configuration; or a beam direction in the second beam configuration is different from a beam direction in the first beam configuration. These and other objectives and advantages of various embodiments of the present disclosure will be apparent to a person of ordinary skill in the art upon review of the following detailed descriptions of the embodiments as illustrated in the accompanying drawings.

According to the method for sending a control signal by using a wide beam, stability of receiving the control signal may be improved, and sensitivity of the control signal to user movement may be reduced. Signals are sent to different user groups by using different narrow beams, so that more targeted data transmission can be performed for users in a coverage area of a same narrow beam, thereby avoiding a throughput bottleneck resulting from use of a wide-beam transmission scheme that is based on frequency-division multiplexing only, and improving an overall system throughput by using a power gain brought by narrow-beam transmission.

BRIEF DESCRIPTION OF DRAWINGS

The accompanying drawings are incorporated in this specification and constitute a part of this specification. In the accompanying drawings, a same number depicts a same element. The accompanying drawings illustrate embodiments of the present disclosure, and are used to explain principles of the present disclosure together with the descriptions.

DESCRIPTION OF EMBODIMENTS

Various embodiments of the present disclosure are referenced in detail, and an example is shown in the accompanying drawings. Although descriptions are provided with reference to these embodiments, it may be understood that these embodiments are not used to limit the present disclosure to these embodiments. Instead, the present disclosure is intended to cover a replacement technology, modification, and an equivalent technology that may be included within the spirit and scope of the present disclosure limited in the appended claims. In addition, in the following detailed descriptions of the present disclosure, many specific details are described to provide a thorough understanding of the present disclosure. However, it may be understood that in an actual application, these specific details of the present disclosure may not be included. A well-known method, process, component, and circuit are not described in detail in another example, so as to prevent various aspects of the present disclosure from being unnecessarily blurred.

Figure 1:
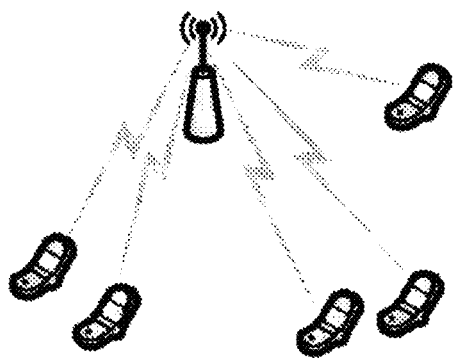
FIG. 1 is a schematic diagram of simple networking in the prior art.
Figure 2:
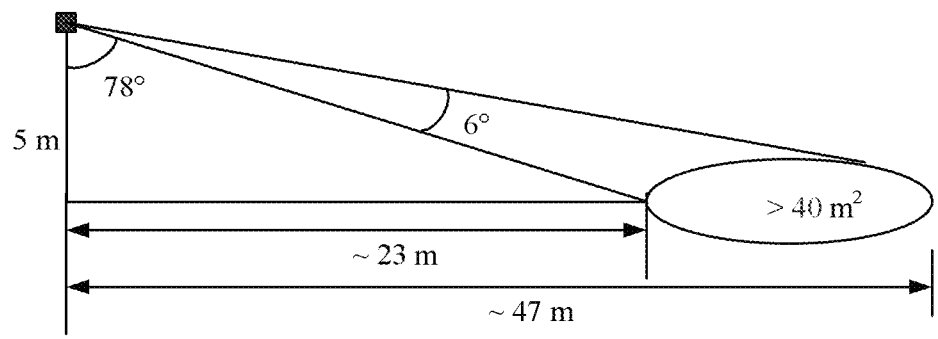
FIG. 2 is a schematic diagram of a coverage area of a directional beam signal after the directional beam signal is transmitted for a specific distance.
Figure 3:
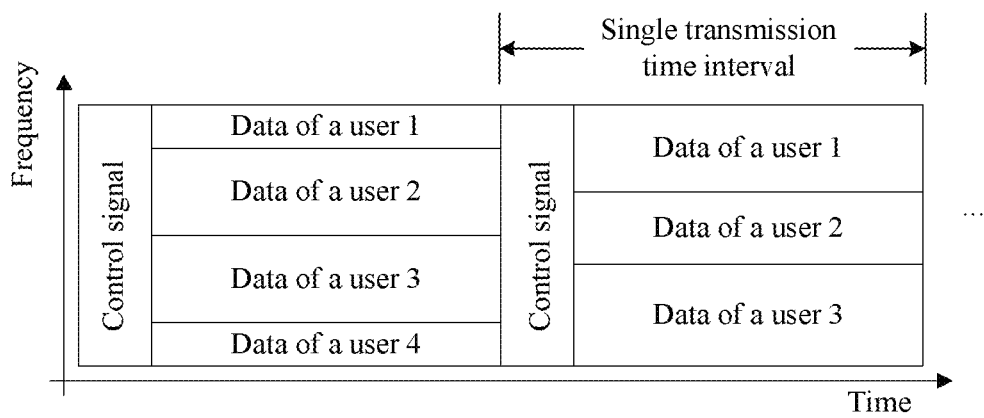
FIG. 3 is a schematic structural diagram of a data frame according to the prior art.

FIG. 3 is a schematic structural diagram of a data frame according to the prior art. As shown in FIG. 3, in an existing fourth-generation cellular communications system used at a low frequency, a basic structure of a downlink data frame that is sent by a base station to a plurality of users includes a control signal and data of the plurality of users. A transmission cycle of the control signal used for carrying control information is the same as a basic transmission time interval. In addition, data sent to all the users occupies other time resources than duration of the control signal in the entire transmission time interval. The data of all the users occupies frequency resources that do not overlap with each other. That is, in one transmission time interval, the base station sends data to a plurality of users in a manner of frequency-division multiplexing. This solution may also be used in high-frequency communication.

If the foregoing solution of sending data of a plurality of users in one transmission time interval in a manner of frequency-division multiplexing is used, a volume of user data that can be simultaneously sent is limited. As a result, the foregoing scenario in which there are a relatively large quantity of users cannot be dealt with. That is, if only a frequency-division multiplexing method is used in high-frequency communication, a user scheduling degree of freedom is low. If data of different users is sent in different transmission time intervals, a scheduling delay corresponding to each user is relatively long, and a system cannot provide a low-delay data transmission service for each user. In addition, a beamforming method is used in a high-frequency communications system, to send a signal by using a formed directional beam, so as to increase received signal strength and a cell coverage area. If data of a plurality of users is sent in a manner of frequency-division multiplexing only in one transmission time interval in the high-frequency communications system, the plurality of users who are currently served need to be in a coverage area of a same directional beam generated by a base station. Therefore, the system cannot further obtain a signal-to-noise ratio (SNR) gain brought during signal transmission performed by using a narrower beam, and therefore cannot further improve a system throughput in such a manner.

A data transmission method provided in the embodiments of the present disclosure can resolve a bottleneck of a low scheduling degree of freedom and a low system throughput that are caused when only frequency-division multiplexing is used in one transmission time interval in high-frequency communication in a case in which there is a relatively high user density, and resolve a problem of a relatively long scheduling delay that is caused due to scheduling data of different users in different transmission time intervals for sending. It should be noted that the data transmission method provided in the embodiments of the present disclosure may also be referred to as a signal transmission method, for example, a high-frequency signal transmission method described below.

In high-frequency communication, a directional beam generated by beamforming has a specific angle domain width characteristic that is usually determined by an angle that exists when a power gain attenuates to a half of a peak gain, where the angle is also referred to as a 3 dB beam width (referred to as a beam width for short below). A beam with a relatively wide 3 dB beam width (for example, greater than 25°, referred to as a wide beam below) has a characteristic of a relatively low signal power gain and a relatively large coverage area. Such a wide beam can be used to send a control signal. Because low-order modulation is usually used for the control signal and the control signal does not require relatively high signal power gain, and the characteristic of the large coverage area of the wide beam can ensure that the control signal is reliably received and the control signal is insensitive to user movement. A beam with a relatively narrow 3 dB beam width (for example, less than 6°, referred to as a narrow beam below) has a characteristic of an extremely high signal power gain and a relatively small coverage area. Such a narrow beam may be used to send a data signal. To improve a throughput, higher-order modulation is usually used for the data signal and the data signal requires a relatively high signal power gain. A requirement for reliable reception of the data signal is lower than that of the control signal.

In the embodiments of the present disclosure, the following solution is provided: Data of a plurality of users is transmitted in a single transmission time interval in a manner of frequency-division multiplexing and time-division multiplexing, and to-be-sent data is transmitted by using a more flexible beam configuration scheme in combination with a newly used time-division multiplexing manner (The beam configuration scheme may indicate a specific beam width and/or a specific beam direction used for sending a specific part of the data). Specifically, a control signal at a start location of each transmission time interval may carry information such as a time resource location and a frequency resource location that are occupied by data that is sent to each user and that is in the current transmission time interval (that is, carrying time-frequency resource information of the data of the plurality of users), and a data of each user is mapped in subsequent data signal transmission according to an indication of the information carried in the control signal. According to this solution, not only a scheduling delay can be reduced, but also an overall system scheduling degree of freedom and an overall system data throughput can be improved.

The signal transmission method provided in the embodiments of the present disclosure further includes: sending a control signal by using a wide beam at a stage of transmitting the control signal, to improve reliability of receiving the control signal; and at a stage of sending a data signal, further grouping users according to angles of the users relative to a base station, where the users are served in a coverage area of the current control signal, and transmitting the data signal for each group of users by using a narrow beam, to increase signal receiving power, thereby achieving an objective of improving a system throughput through high-order modulation. In one transmission time interval, time-division multiplexing is used, and a wide beam and a narrow beam are respectively used to transmit a control signal and a data signal This can avoid a throughput bottleneck resulting from use of a transmission scheme that is based on frequency-division multiplexing only.

It should be noted that the embodiments of the present disclosure are not limited to being applied to a high-frequency communications system, and may also be used in a low-frequency communications system or a high and low frequency hybrid communications system. The following describes the embodiments by using a high-frequency base station as an example. The high-frequency base station may be replaced with a low-frequency base station or a high and low frequency hybrid base station. Correspondingly, a signal that is sent may alternatively be a low-frequency signal or a high and low frequency hybrid signal. In addition, the embodiments of the present disclosure may similarly be applied to a Wi-Fi system.

Embodiment 1

A high-frequency base station (which may be a base station working at a high frequency band) sends a control signal at a start location of a single downlink transmission time interval (that is, the control signal is located at a header of one transmission time interval); and adds, to the control signal, information such as a time location and a frequency location that are occupied by data of each currently served user in the current transmission time interval.

Figure 4:
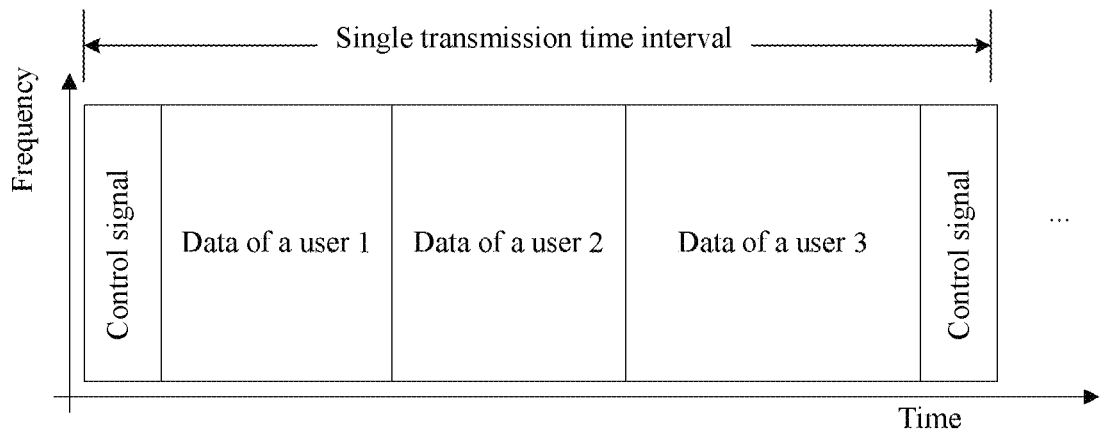
FIG. 4 is a schematic diagram of a frame structure corresponding to a first high-frequency signal transmission method according to an embodiment of the present disclosure.

FIG. 4 is a schematic diagram of a frame structure corresponding to a first high-frequency signal transmission method according to an embodiment of the present disclosure. As shown in FIG. 4, a time resource occupied by a data part of a downlink data frame in a single transmission time interval is divided into three parts. Data of users 1 to 3 separately occupies a part of the time resource. Certainly, there may be two or more users. In addition, the time resource occupied by the data part may alternatively be divided into two or more parts. The time resource is divided in the single transmission time interval, so that data of different users (for example, the data of the user 1 and the data of the user 2 in FIG. 4) can be sent in a manner of time-division multiplexing. On this basis, a frequency resource may also be divided into one or more frequency bands, so that data of different users (for example, data of a user 5 and data of a user 6 in FIG. 5) can be sent in a manner of frequency-division multiplexing.

Figure 5:
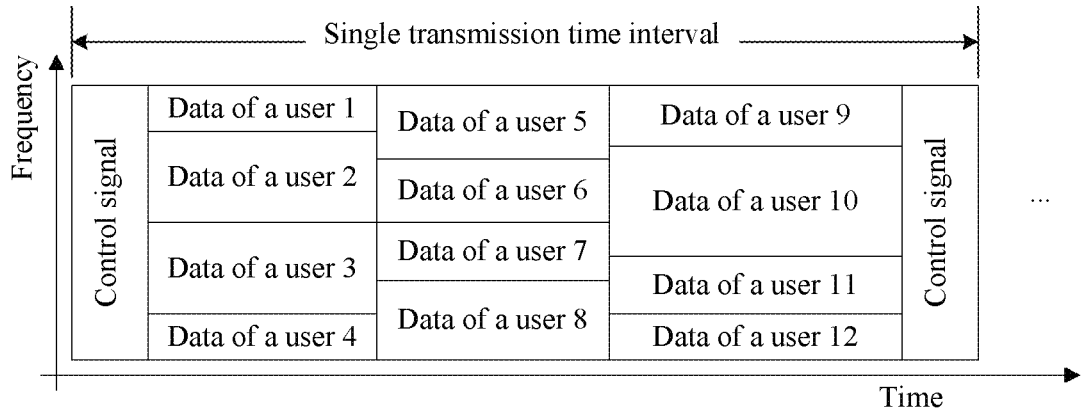
FIG. 5 is a schematic diagram of a frame structure corresponding to a second high-frequency signal transmission method according to an embodiment of the present disclosure.

FIG. 5 is a schematic diagram of a frame structure corresponding to a second high-frequency signal transmission method according to an embodiment of the present disclosure. As shown in FIG. 5, a base station maps data of each user to a corresponding location according to information such as a time location and a frequency location that are occupied by the data of each user, where the information is carried in a control signal. Specifically, the base station (or a high-frequency base station) generates a downlink data frame. Duration of the data frame is one transmission time interval TTI. The downlink data frame includes a control part (for example, a control signal in FIG. 5) located at a header and a data part used for transmitting data of a plurality of users (for example, data of users 1 to 12 in FIG. 5). Time resources occupied by data of at least two users in the data of the plurality of users are different (that is, data of at least two users occupies different time resources, for example, the data of the user 1 and the data of the user 5 in FIG. 5 occupy different time resources). The control part carries information about a time location and a frequency location that are occupied by data of each user in the data of the plurality of users, and the information may indicate a range of a time location at which data of a user is located and a range of a frequency location at which the data of the user is located, or may indicate a start location and a quantity of time resources at which data of a user is located and a start location and a quantity of frequency resources at which the data of the user is located. The base station sends the downlink data frame. Further, the base station modulates the downlink data frame to form a to-be-sent signal, and sends the signal by using an intermediate radio frequency link. A current user first demodulates the control signal part in the received signal, determines a time location and a frequency location at which data sent by the base station to the user is located in the current transmission time interval, and then performs data demodulation to restore the data of the user.

Embodiment 2

For users who need to be served in a current transmission time interval, a high-frequency base station groups the users according to angles of the users relative to the base station, and classifies, into a same user group, users whose angles are close to each other. Then, the base station transmits data to a plurality of user groups in a manner of time-division multiplexing. The base station sends the data of all the user groups by using different beams, and performs beam switching at a switching point between divided time resources. Data of users in each user group occupies different frequency resources.

Figure 6:
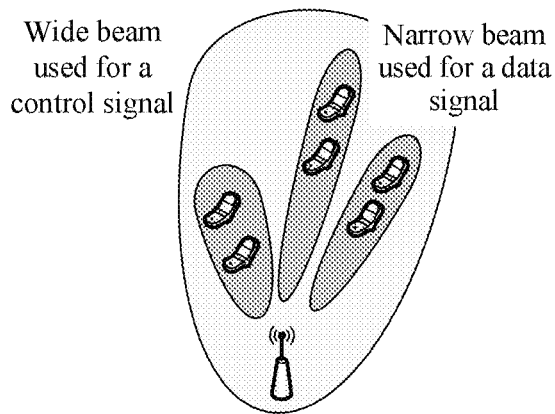
FIG. 6 is a schematic diagram of a solution in which different types of data is transmitted by using beams of different widths according to an embodiment of the present disclosure.
Figure 7:
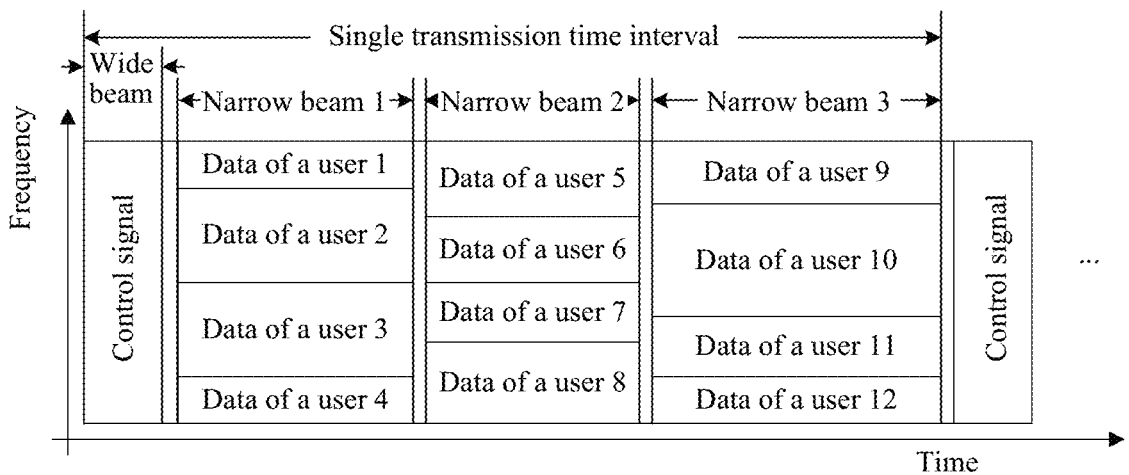
FIG. 7 is a schematic diagram of a frame structure corresponding to a third high-frequency signal transmission method according to an embodiment of the present disclosure.

FIG. 6 is a schematic diagram of a solution in which different types of data is transmitted by using beams of different widths according to an embodiment of the present disclosure. As shown in FIG. 6, users whose angles relative to a base station are close to each other may be classified into a same user group. FIG. 7 is a schematic diagram of a frame structure corresponding to a third high-frequency signal transmission method according to an embodiment of the present disclosure. As shown in FIG. 7, data of a same user group may be transmitted by using a same beam. Specifically, for users shown in FIG. 7, users 1 to 4 form a first user group, users 5 to 8 form a second user group, and users 9 to 12 form a third user group. Data of the three user groups is sent in a manner of time-division multiplexing. A base station transmits, by using a wide beam, a control signal located at a start location of a current transmission time interval. The base station transmits a subsequent data signal by using a narrow beam. The base station transmits data of different user groups by using narrow beams with different directions and widths. For example, in FIG. 7, data of the first user group is transmitted by using a narrow beam 1, data of the second user group is transmitted by using a narrow beam 2, and data of the third user group is transmitted by using a narrow beam 3. The narrow beams 1 to 3 may have different beam directions and beam widths. Because angles of the user groups relative to the base station have different centers and ranges, a plurality of narrow beams used by the base station have different directions and widths. According to such a transmission scheme, the base station can provide each user group with higher signal receiving power by fully using a power gain brought by a narrow beam, so as to improve an overall system throughput. The base station may need to perform beam switching within a time period between sending data of successive two user groups. Therefore, as shown in FIG. 7, the base station reserves, within the time period between sending data of successive two user groups, a time resource for beam switching.

It should be noted that the wide beam and the narrow beam in this embodiment of the present disclosure are relative concepts. Generally, an angle of 25 degrees is used as a limit, a beam with a 3 dB beam width greater than 25 degrees may be considered as a wide beam, and a beam with a 3 dB beam width less than 25 degrees may be considered as a narrow beam. Certainly, the limit 25 degrees herein may be another value. In addition, configurations and concepts of the wide beam and the narrow beam may be flexibly determined by the base station. The wide beam in FIG. 7 needs to cover the user group to which the users 1 to 4 belong, the user group to which the users 5 to 8 belong, and the user group to which the users 9 to 12 belong, a coverage area is relatively large, and therefore, the beam may be referred to as a wide beam. The narrow beam 1 needs to cover only the user group to which the users 1 to 4 belong, a coverage area is relatively small, and therefore, the beam may be referred to as a narrow beam.

A current user first demodulates the control signal part in a received signal, determines a time location and a frequency location at which data sent by the base station to the user is located in the current transmission time interval, and then performs data demodulation to restore the data of the user.

Embodiment 3

For users who need to be served in a current transmission time interval, a high-frequency base station groups the users according to angles of the users relative to the base station, and classifies, into a same user group, users whose angles are close to each other. Then, the base station transmits data to a plurality of user groups in a manner of time-division multiplexing. The base station sends the data of all the user groups by using different beams, and performs beam switching at a switching point of time-division multiplexing. Data of users in each user group occupies different frequency resources.

Figure 8:
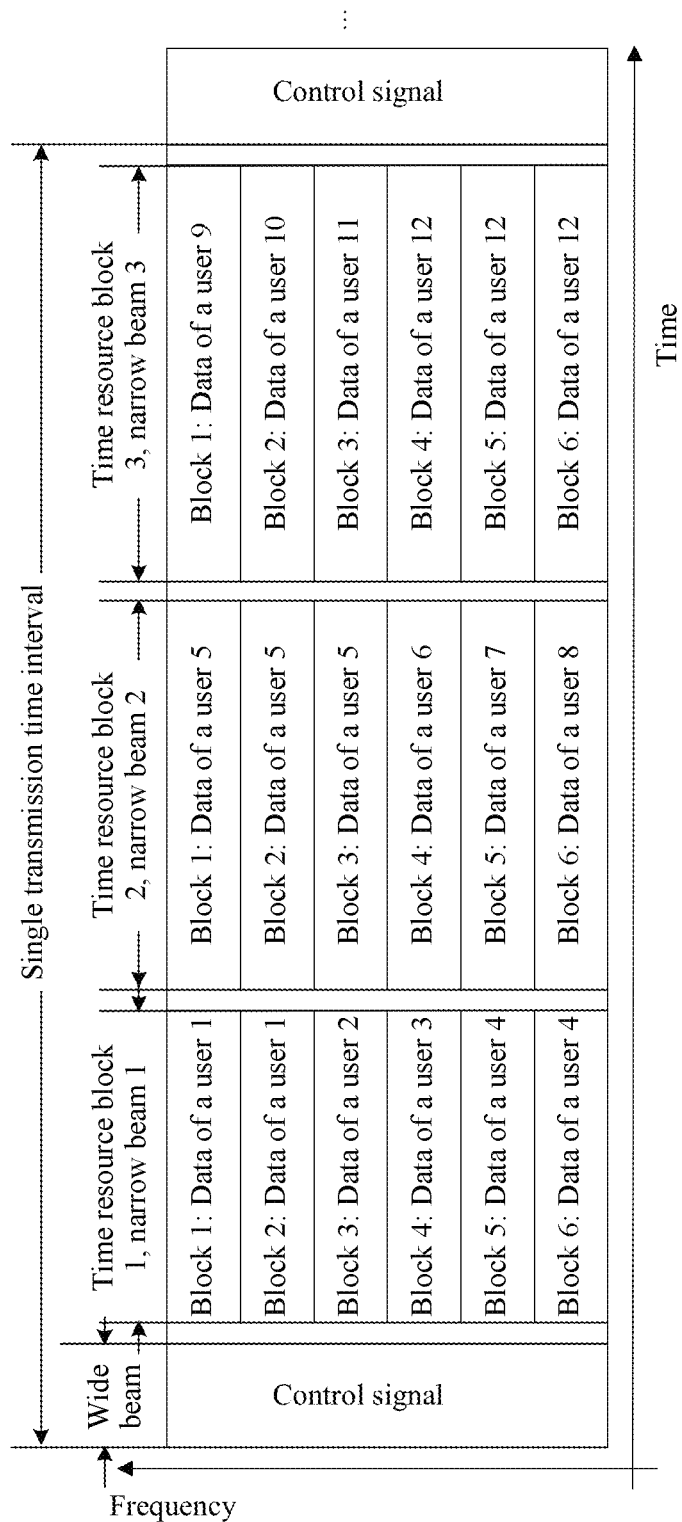
FIG. 8 is a schematic diagram of a frame structure corresponding to a fourth high-frequency signal transmission method according to an embodiment of the present disclosure.

FIG. 8 is a schematic diagram of a frame structure corresponding to a fourth high-frequency signal transmission method according to an embodiment of the present disclosure. As shown in FIG. 8, a base station divides a time resource and a frequency resource in a single transmission time interval into blocks according to a preset minimum granularity and a rule agreed on in advance, and numbers the blocks. The base station sends a control signal at a start location of the single transmission time interval, and adds, to the control signal, a number of a resource block that is used for transmitting data of each user. Data sent to a user may occupy one or more resource blocks. The base station maps the data of each user to a corresponding location according to the number of the resource block carried in the control signal, to form a downlink data frame; modulates the downlink data frame to form a to-be-sent signal; and sends the signal by using an intermediate radio frequency link. A current user first demodulates the control signal part in the received signal and determines a number of a resource block in which data sent by the base station to the user is located. Then, the user determines, according to a mapping rule agreed on in advance, a time resource location and a frequency resource location at which the data sent by the base station to the user is located in the current transmission time interval, and then performs data demodulation to restore the data of the user.

Further, for users who need to be served in a current transmission time interval, the base station may group the users according to angles of the users relative to the base station, and classifies, into a same user group, users whose angles are close to each other. Then, the base station transmits data to a plurality of user groups in a manner of time-division multiplexing. The base station sends the data of all the user groups by using different beams, and performs beam switching at a switching point of time-division multiplexing. Data of users in each user group occupies different frequency resources. Specifically, as shown in FIG. 8, according to a rule agreed on in advance, the base station divides, according to a quantity of user groups served in the current transmission time interval, other part than duration of the control signal in the current transmission time interval into a plurality of time resource blocks (for example, time resource blocks 1 to 3 in FIG. 8) whose quantity is the same as the quantity of the current user groups, and reserves, between these time resource blocks, a time resource for beam switching. The base station transmits the control signal at the start location of the current transmission time interval by using a wide beam. The base station transmits a subsequent data signal by using a narrow beam. The base station transmits data in different time resource blocks by using narrow beams with different directions and widths (for example, in FIG. 8, data in the time resource block 1 is transmitted by using a narrow beam 1, data in the time resource block 2 is transmitted by using a narrow beam 2, and data in the time resource block 3 is transmitted by using a narrow beam 3). The base station may need to perform beam switching within a time period (or a time interval) between sending data of two adjacent user groups.

A current user first demodulates the control signal part in the received signal and determines a number of a time resource block and a frequency resource block at which data sent by the base station to the user is located. Then, the user determines, according to a mapping rule agreed on in advance, a time resource location and a frequency resource location at which the data sent by the base station to the user is located in the current transmission time interval, and then performs data demodulation to restore the data of the user.

Embodiment 4

In Embodiment 2 and Embodiment 3, in a single transmission time interval, the base station sends a control signal by using a wide beam and sends data signals to user groups in different directions by using different narrow beams. This process includes a beam switching operation. In a beam switching process, the base station cannot transmit a signal effectively. Therefore, a specific time resource (or a time interval) needs to be reserved or a specific redundant signal needs to be provided for beam switching, to prevent relatively great distortion of signal transmission due to beam switching. This embodiment provides two manners of reserving a time resource or a redundant signal for beam switching.

Figure 9:
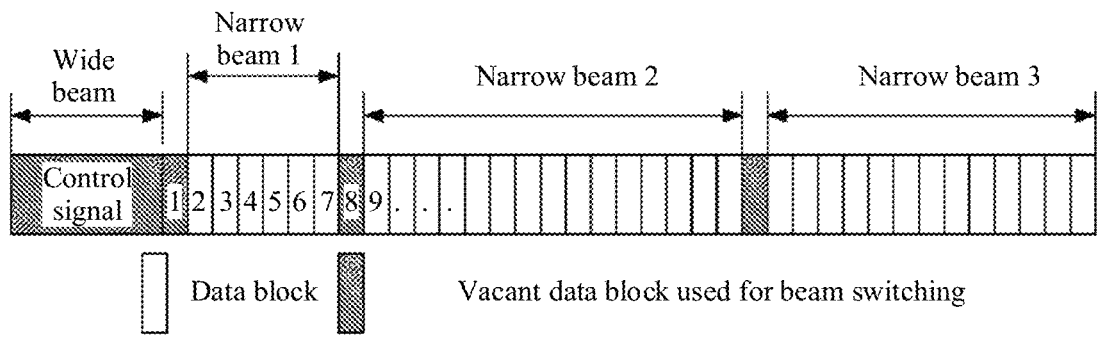
FIG. 9 is a schematic diagram of a solution for reserving a time resource for beam switching according to an embodiment of the present disclosure.

FIG. 9 is a schematic diagram of a solution for reserving a time resource for beam switching according to an embodiment of the present disclosure. As shown in FIG. 9, a time resource in a single transmission time interval is divided into a plurality of data blocks and data of a user is sent according to the data blocks. A division granularity of the data blocks or duration of a data block is not limited in the present disclosure. These data blocks are numbered (for example, data blocks in a narrow beam 1 are numbered from 2 to 7 in FIG. 9), and some specific data blocks (for example, a data block 1 and a data block 8 in FIG. 9) are reserved for beam switching and are not used for sending a signal. In this solution, the base station may specify, in a control signal at a start location of the single transmission time interval, numbers of data blocks that are not used for sending a signal (for example, numbers 1 and 8 in FIG. 9). A user may determine a time location of valid data in a received signal by using such information, or may determine, by using such information, information such as a quantity of and locations of time resource blocks in a current transmission time interval mentioned in Embodiment 3 and Embodiment 4, to facilitate subsequent signal demodulation and restoration. In another implementation, the base station may simply keep a symbol reserved for beam switching as a vacant symbol and do not specify a number of the symbol in the control signal, and a user determines a location of the vacant symbol according to an amplitude of a received signal, to obtain the related information motioned above and perform subsequent signal demodulation and restoration.

Figure 10:
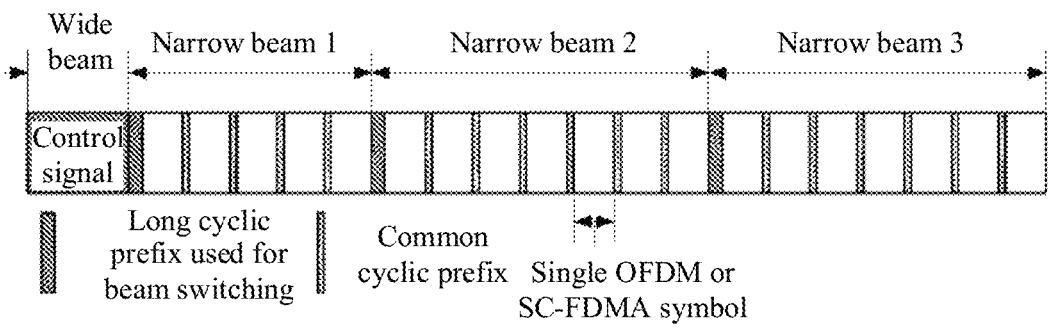
FIG. 10 is a schematic diagram of another solution for reserving a redundant signal for beam switching according to an embodiment of the present disclosure.

FIG. 10 is a schematic diagram of another solution for reserving a redundant signal for beam switching according to an embodiment of the present disclosure. As shown in FIG. 10, if a signal is transmitted by using an orthogonal frequency division multiplexing (OFDM) based multi-carrier waveform or a single-carrier frequency division multiple access (SC-FDMA) based single-carrier waveform, a cyclic prefix (CP) is usually added in front of each OFDM or SC-FDMA symbol, to eliminate or reduce impact caused by a multipath channel. Such a cyclic prefix is usually simply removed by a receiver. To provide a redundant signal for beam switching, these OFDM or SC-FDMA symbols may be numbered, and cyclic prefixes of some OFDM or SC-FDMA symbols are lengthened, so that a base station can perform beam switching at these long cyclic prefixes. In such a signal transmission scheme, even if a specific error occurs on the cyclic prefixes of these OFDM or SC-FDMA symbols with the long cyclic prefixes in a receiving process due to impact of beam switching, there is a low loss of a capability of eliminating or reducing time-domain spread caused by a multipath channel, and overall system demodulation performance is little affected. In this solution, the base station may add numbers of the OFDM or SC-FDMA symbols with the long cyclic prefixes to a control signal at a start location of a single transmission time interval. A user may determine a time location of other valid data than the cyclic prefix in a received signal by using such information, or may determine, by using such information, information such as a quantity of and locations of time resource blocks in a current transmission time interval mentioned in Embodiment 2 and Embodiment 3, to facilitate subsequent signal demodulation and restoration.

Beneficial effects of the downlink signal transmission method that is for high frequency communication and that is provided in the present disclosure include: time-division multiplexing is used in one transmission time interval, so that a higher scheduling degree of freedom can be provided for a high-frequency communications system, and a scheduling delay corresponding to each user is reduced in a scenario of a high user density and a low rate requirement; according to a method for sending a control signal by using a wide beam, stability of receiving the control signal may be improved, and sensitivity of the control signal to user movement may be reduced; according to a method in combination with time-division multiplexing, signals are sent to different user groups by using different narrow beams, so that more targeted data transmission can be performed for users in a coverage area of a same narrow beam, thereby avoiding a throughput bottleneck resulting from use of a wide-beam transmission scheme that is based on frequency-division multiplexing only, and improving an overall system throughput by using a power gain brought by narrow-beam transmission. In addition, the downlink signal transmission method that is for high-frequency communication and that is provided in the present disclosure can more efficiently support use of a same transmission time interval and a same control signaling cycle in high-frequency communication and low-frequency communication, so as to facilitate an inter-band scheduling operation and data service transfer and switching operations.

Corresponding to the foregoing method embodiments, an embodiment of the present disclosure further provides a downlink data transmission apparatus, including:

a generation module, configured to generate a downlink data frame, where duration of the data frame is one transmission time interval TTI; and the downlink data frame includes a control part located at a header and a data part used for transmitting data of a plurality of users, where time resources occupied by data of at least two users in the data of the plurality of users are different; and the control part carries information about a time location and a frequency location that are occupied by data of each user in the data of the plurality of users; and a sending module, configured to send the downlink data frame.

Some technical characteristics included in the foregoing apparatus embodiment, such as the transmission time interval, the control part, and the data part, as well as other further descriptions (such as a wide beam, a narrow beam, beam switching, and a beam configuration) are similar or corresponding to some technical characteristics included in the foregoing method embodiments. Details are not repeatedly described herein.

Figure 11:
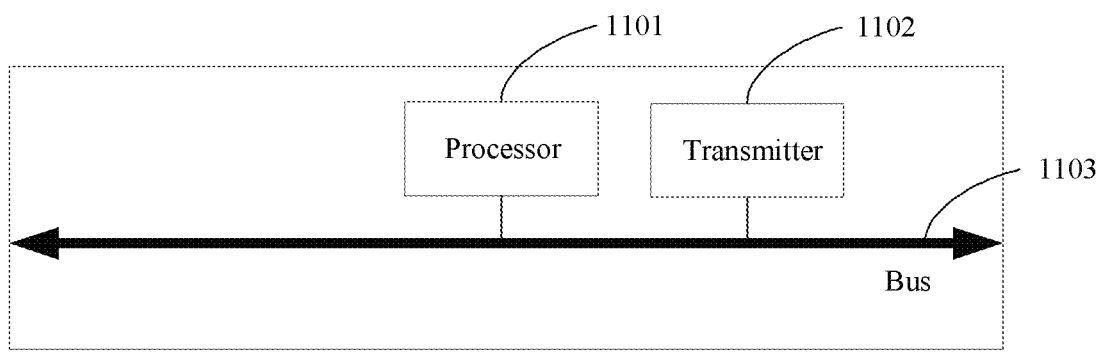
FIG. 11 is a schematic diagram of a downlink data transmission device according to an embodiment of the present disclosure.

Corresponding to the foregoing method embodiments, as shown in FIG. 11, an embodiment of the present disclosure provides a downlink data transmission device, including a processor 1101, a transmitter 1102, and a bus 1103, where the processor 1101 and the transmitter 1102 are connected by using the bus 1103 for data transmission.

The processor 1101 is configured to generate a downlink data frame, where duration of the data frame is one transmission time interval TTI; and the downlink data frame includes a control part located at a header and a data part used for transmitting data of a plurality of users, where time resources occupied by data of at least two users in the data of the plurality of users are different; and the control part carries information about a time location and a frequency location that are occupied by data of each user in the data of the plurality of users.

The transmitter 1102 is configured to send the downlink data frame.

Further, the device may include a memory. The memory is configured to store an instruction or a program that is required by the processor 1101 for performing an operation.

Some technical characteristics included in the foregoing apparatus embodiment, such as the transmission time interval, the control part, and the data part, as well as other further descriptions (such as a wide beam, a narrow beam, beam switching, and a beam configuration) are similar or corresponding to some technical characteristics included in the foregoing method embodiments. Details are not repeatedly described herein.

It should be particularly noted that, in addition to a specific operation part corresponding to a high frequency, the embodiments of the present disclosure may also be used for a low-frequency system or a high and low frequency hybrid system.

Although the present disclosure is described in specific embodiments, it should be understood that the present disclosure should not be interpreted as being limited to these embodiments, but is explained according to the claims.

What is claimed is:

1. A downlink data transmission method, comprising:
generating a downlink frame, wherein a duration of the downlink frame is a single transmission time interval (TTI), wherein the downlink frame comprises:
a control part located at a header of the downlink frame, and
a data part for transmitting data of a plurality of user equipment devices (UEs),
wherein the control part carries information about a time resource and a frequency resource that are allocated for the data part; and
sending the downlink frame, by using a first beam and a second beam, within the single TTI comprising a control part interval, a data part interval and a beam switching interval;
wherein the sending the downlink frame within the single TTI includes:
transmitting, using the first beam during the control part interval, a control signal associated with the control part of the downlink frame, and
transmitting, using the second beam during the data part interval, a data signal associated with the data part of the downlink frame,
wherein the beam switching time interval, for beam switching between the first beam and the second beam within the single TTI of the downlink frame, is defined between completing the transmitting the control signal during the control part interval and commencing the transmitting the data signal during the data part interval within the single TTI of the downlink frame.

2. The downlink data transmission method according to claim 1, wherein
the time resource and the frequency resource that are allocated to the data part are divided into time-frequency resource blocks according to a preset granularity, wherein each time-frequency resource block is corresponding to a number; and
the information about the time resource and the frequency resource that are allocated to the data part includes a number or numbers of one or more time-frequency resource blocks allocated to data of each UE.

3. The downlink data transmission method according to claim 1, wherein the second beam is different from the first beam.

4. The downlink data transmission method according to claim 3, wherein
a beam width of the second beam is less than a beam width of the first beam; or
a beam direction of the second beam is different from a beam direction of the first beam.

5. The downlink data transmission method according to claim 1, wherein the plurality of UEs includes a first UE and a second UE;
wherein a time resource allocated to data of the first UE and a time resource allocated to data of the second UE are different.

6. A downlink data transmission device, comprising a processor, and a transmitter, wherein the processor is coupled to the transmitter;
wherein the processor is configured to generate a downlink frame, wherein duration of the downlink frame is a single transmission time interval (TTI), and wherein the downlink frame comprises:
a control part located at a header of the downlink frame, and
a data part used for transmitting data of a plurality of user equipment devices (UEs),
wherein the control part carries information about a time resource and a frequency resource that are allocated for the data part; and
wherein the transmitter is configured to send the downlink frame, by using a first beam and a second beam, within the single TTI comprising a control part interval, a data part interval and a beam switching interval; wherein the sending the downlink frame within the single TTI includes:
transmitting, using the first beam during the control part interval, a control signal associated with the control part of the downlink frame, and
transmitting, using the second beam during the data part interval, a data signal associated with the data part of the downlink frame,
wherein the beam switching time interval, for beam switching between the first beam and the second beam within the single TTI of the downlink frame, is defined between completing the transmitting the control signal during the control part interval and commencing the transmitting the data signal during the data part interval within the single TTI of the downlink frame.

7. The downlink data transmission device according to claim 6, wherein
the time resource and the frequency resource that are allocated to the data part are divided into time-frequency resource blocks according to a preset granularity, wherein each time-frequency resource block is corresponding to a number; and
the information about the time resource and the frequency resource that are allocated to the data part includes a number or numbers of one or more time-frequency resource blocks allocated to data of each UE.

8. The downlink data transmission device according to claim 6, wherein the second beam is different from the first beam.

9. The downlink data transmission device according to claim 8, wherein
a beam width of the second beam is less than a beam width of the first beam; or
a beam direction of the second beam is different from a beam direction of the first beam.

10. The downlink data transmission device according to claim 6, wherein the plurality of UEs includes a first UE and a second UE;
wherein a time resource allocated to data of the first UE and a time resource allocated to data of the second UE are different.

11. A downlink data receiving method, comprising:
receiving a downlink frame, wherein a duration of the downlink frame is a single transmission time interval (TTI) comprising a control part interval, a data part interval and a beam switching interval; wherein the downlink frame comprises:
a control part located at a header of the downlink frame, and
a data part used for transmitting data of a plurality of user equipment devices (UEs),
wherein the control part carries information about a time resource and a frequency resource that are allocated for the data part, and wherein the control part of the downlink frame is received by using a first beam during the control part interval, and wherein the data part of the downlink frame is received by using a second beam during the data part interval within the single TTI; and demodulating the control part of the downlink frame, wherein the demodulating includes demodulating a control signal associated with the control part, wherein the beam switching time interval, for beam switching between the first beam and the second beam within the single TTI of the downlink frame, is defined between an endpoint of the control signal and a starting point of a data signal associated with the data part during the data part interval within the single TTI of the downlink frame.

12. The downlink data receiving method according to claim 11, wherein the second beam is different from the first beam.

13. The downlink data receiving method according to claim 12, wherein a beam width of the second beam is less than a beam width of the first beam; or a beam direction of the second beam is different from a beam direction of the first beam.

14. The downlink data receiving method according to claim 11, wherein the plurality of UEs includes a first UE and a second UE;

wherein a time resource allocated to data of the first UE and a time resource allocated to data of the second UE are different.

15. A downlink data receiving device, comprising:

a processor;

a receiver; and a bus, wherein the processor is coupled to the receiver, wherein the receiver is configured to receive a downlink frame, wherein a duration of the downlink frame is a single transmission time interval (TTI) comprising a control part interval, a data part interval and a beam switching interval;

wherein the downlink frame comprises:

a control part located at a header of the downlink frame, and a data part used for transmitting data of a plurality of user equipment devices (UEs), wherein the control part carries information about a time resource and a frequency resource that are allocated for the data part, wherein the processor is configured to demodulate the control part of the downlink frame, wherein the demodulating includes demodulating a control signal associated with the control part, wherein the control part of the downlink frame is received by using a first beam during the control part interval, and wherein the data part of the downlink frame is received by using a second beam during the data part interval within the single TTI, and wherein the beam switching time interval, for beam switching between the first beam and the second beam within the single TTI of the downlink frame, is defined between an endpoint of the control signal and a starting point of a data signal associated with the data part during the data part interval within the single TTI of the downlink frame.

16. The downlink data receiving device according to claim 15, wherein the second beam is different from the first beam.

17. The downlink data receiving device according to claim 16, wherein a beam width of the second beam is less than a beam width of the first beam; or a beam direction of the second beam is different from a beam direction of the first beam.

18. The downlink data receiving device according to claim 15, wherein the plurality of UEs includes a first UE and a second UE;

wherein a time resource allocated to data of the first UE and a time resource allocated to data of the second UE are different.

* * * * *